US012612173B2

(12) United States Patent　　　　(10) Patent No.:　US 12,612,173 B2

Majowicz　　　　　　　　　　　　　(45) Date of Patent:　Apr. 28, 2026

(54) ELECTRICAL POWER SYSTEMS AND METHODS

(71) Applicant: ROLLS-ROYCE plc, London (GB)

(72) Inventor: Miroslaw J Majowicz, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/975,812

(22) Filed: Dec. 10, 2024

(65) Prior Publication Data

US 2025/0197020 A1　　　Jun. 19, 2025

(30) Foreign Application Priority Data

Dec. 18, 2023　　(GB) ...................................... 2319366

(51) Int. Cl.
　　　*B64D 31/16*　　　(2024.01)
　　　*H02H 3/04*　　　(2006.01)
(52) U.S. Cl.
　　　CPC ............. *B64D 31/16* (2024.01); *H02H 3/042* (2013.01); *B64D 2221/00* (2013.01); *H02J 2310/44* (2020.01)
(58) Field of Classification Search
　　　CPC .... B64D 31/16; B64D 2221/00; H02H 3/042; H02H 3/063; H02H 7/28; H02J 2310/44; H02J 3/0073; H02J 2310/58; H02J 3/04
　　　See application file for complete search history.

(56) References Cited

U.S. PATENT DOCUMENTS

| | | | |
|---|---|---|---|
| 5,608,327 A | 3/1997 | Jones et al. | |
| 2010/0284117 A1 | 11/2010 | Crane | |

| | | | |
|---|---|---|---|
| 2016/0365722 A1 | 12/2016 | Armstrong et al. | |
| 2020/0295557 A1 | 9/2020 | Cox | |
| 2022/0393461 A1 | 12/2022 | Pihl et al. | |
| 2025/0110168 A1* | 4/2025 | Khozikov | ........... H02H 1/0015 |

FOREIGN PATENT DOCUMENTS

| | | |
|---|---|---|
| EP | 4 054 043 A1 | 9/2022 |
| EP | 4 197 913 A1 | 6/2023 |

OTHER PUBLICATIONS

Jul. 31, 2024 Search Report issued in British Patent Application No. 2319366.7.

* cited by examiner

*Primary Examiner* — Daniel Cavallari

(74) *Attorney, Agent, or Firm* — Oliff PLC

(57)　　　　　　ABSTRACT

An electrical power system including a plurality of electrical devices, a distribution network and a control system. The control system is configured to detect an electrical fault associated with the distribution network based on a signal received from a sensor and to perform a fault procedure in response to a fault detection, including: (a) controlling a plurality of switches so all of the devices are isolated from the network; (b) subsequently controlling the switches to progressively re-couple at least some of the devices to the network in a re-coupling order and monitoring for re-detection of a fault; (c) identifying a set of one or more of the devices re-coupled to the distribution network to cause the re-detection of the fault, the set being a fault event set; and controlling at least one of the plurality of switches to isolate the fault event set from the network.

15 Claims, 10 Drawing Sheets

201, 202,
203, 204

101

10

ELECTRICAL POWER SYSTEMS AND METHODS

This specification is based upon and claims the benefit of priority from UK Patent Application Number 2319366.7 filed on 18 Dec. 2023, the entire contents of which are incorporated herein by reference.

BACKGROUND

Technical Field

This disclosure relates to electrical power systems for an aerial vehicle and associated methods.

Background of the Disclosure

It is known to provide electrical power systems which are configured to identify, and/or associated methods of identifying, a location of a fault in a electrical power system.

An example conventional approach of doing so includes the provision of multiple independent power supply channels/lines within the electrical power system and then disconnecting/disabling one of multiple independent power supply channels/lines when a fault is detected within that channel/line. A disadvantage of such an approach is that a small/single fault results in the disconnection/disabling of an entire power supply channel/line. As a result, in order to ensure safe operation of the electrical power system, multiple independent power supply channels/lines have to be provided, which may result in a high installation mass and/or a high complexity of the electrical power system.

An alternative example conventional approach of achieving the same objective is the application of a complex fault detection system which is configured to detect a fault and disconnect/disable only a part of a power supply channel/line which is associated with the fault without affecting the remaining part of the power supply channel/line. Such an alternative approach may make use of auto-reclose devices or insulation monitoring devices positioned at various points within the electrical power system. These kinds of devices are relatively complicated and may be unreliable. In addition, while these kinds of devices can generally function relatively effectively in "high impedance" systems (e.g., electrical power systems comprising a relatively large amount of impedance), they cannot typically function effectively in "low impedance" systems (e.g., electrical power systems comprising a relatively small amount of impedance). This is because their operation depends on an impedance between devices of the electrical power system which acts to delay a propagation of the fault across the network and therefore allows a location of the fault in the electrical power system to be identified. If there is a relatively low impedance between the devices of the electrical power system, the propagation of the fault across the electrical power system may be so fast that more than one of the devices may detect or mirror the fault at substantially the same time, making it effectively impossible to identify the location of the original fault within the electrical power system. Examples of "high impedance" systems include large distribution networks for transmitting power over long distances (such as a power grid) whereas examples of "low impedance" systems include power supply networks within units in which transmission lines are relatively short compared to power grids (such as those for use in aircraft, ships and the like).

SUMMARY

According to a first aspect there is provided an electrical power system comprising a plurality of electrical devices, a distribution network and a control system, wherein the plurality of electrical devices includes a primary set of electrical sources and a primary set of electrical loads; wherein the distribution network is configured to electrically couple the primary set of electrical loads to the primary set of electrical sources; wherein the distribution network comprises: a plurality of switches, each switch being configured to selectively isolate a respective electrical device from the distribution network, and a sensor; and wherein the control system is configured to detect an electrical fault associated with the distribution network based on a signal received from the sensor, and is further configured to perform a fault procedure in response to detection of an electrical fault, the fault procedure comprising: (a) controlling the plurality of switches such that all of the electrical devices are isolated from the distribution network; (b) subsequently controlling the switches to progressively re-couple at least some of the plurality of electrical devices to the distribution network in a re-coupling order (e.g., a predetermined re-coupling order) and monitoring for re-detection of an electrical fault based on a signal received from the sensor as the electrical devices are progressively re-coupled; (c) identifying a set of one or more of the plurality of electrical devices re-coupled to the distribution network to cause the re-detection of the electrical fault, the set of one or more electrical devices being a fault event set; and controlling at least one of the plurality of switches to isolate the fault event set from the distribution network. The electrical power system may be for an aerial vehicle such as an aircraft.

All references to "subset" in this disclosure relate to a proper subset, i.e., a set which is less than the whole of the parent set. The primary set of electrical sources may include one or more, or two or more, electrical sources.

The fault procedure may comprise controlling the switches to individually re-couple each of the at least some of the plurality of electrical devices to the distribution network in the re-coupling order (e.g., the predetermined re-coupling order).

It may be that the fault procedure comprises: (b) controlling the switches to progressively re-couple the electrical devices to the distribution network in the re-coupling order in groups of electrical devices, at least one of the groups comprising two or more electrical devices.

The fault procedure may comprise: (a) controlling the switches such that all of the electrical devices are isolated from the distribution network; and (b) subsequently controlling the switches to progressively re-couple each of the electrical devices to the distribution network in the re-coupling order until re-detection of the electrical fault.

The fault procedure may further comprises: (d) subsequently controlling the switches such that all of the electrical devices are isolated from the distribution network; and (e) controlling the switches to re-couple a subset of the at least some of the plurality of electrical devices which excludes the fault event set. In step (e), the subset of the electrical devices may be re-coupled in a re-coupling order (e.g., a predetermined re-coupling order) which is derived from the re-coupling order (of step (b)).

The control system may be further configured to control the switches such that the fault event set of one or more electrical devices is isolated from the distribution network until a reset signal is received.

It may be that the primary set of electrical loads includes a high priority set of one or more electrical loads. It may also be that the re-coupling order is such that re-coupling of the high priority set to the distribution network is prioritised during execution of the fault procedure. It may be that each of the high priority electrical loads have a function which is considered to be critical to safe operation of the aerial vehicle.

The re-coupling order may be such that all electrical loads of the high priority set are simultaneously re-coupled to the distribution network during execution of the fault procedure.

The primary set of electrical loads may include a low priority set of one or more electrical loads. The re-coupling order may be such that all of the high priority set are re-coupled to the distribution network before any of the low priority set are re-coupled to the distribution network during execution of the fault procedure. It may be that each of the low priority electrical loads have a function which is not considered to be critical to safe operation of the aerial vehicle.

It may be that the fault procedure comprises controlling the switches to re-couple only the high priority set of electrical devices to the distribution network. It may also be that the control system is configured to control the switches such that the low priority set of electrical devices are isolated from the distribution network until a reset signal is received.

It may be that the distribution network is a primary distribution network, the plurality of switches is a primary plurality of switches, the sensor is a primary sensor, and the fault sequence is a primary fault sequence. The electrical power system may comprise a secondary distribution network distinct from the primary distribution network. The secondary distribution network may be configured to electrically couple the primary set of electrical loads or an overlapping secondary set of electrical loads to: the primary set of electrical sources, or a secondary set of electrical sources.

The secondary set of electrical sources may be (i) mutually exclusive with the primary set of electrical sources; (ii) a subset of the primary set of electrical sources; or (iii) an overlapping set of electrical sources, including a subset of the primary set of electrical sources and a set of one or more other electrical sources (not in the primary set of electrical sources).

The secondary distribution network may be configured to electrically couple the primary set of electrical loads to: the primary set of electrical sources, or a secondary set of electrical sources.

It may be that the secondary distribution network comprises: a secondary plurality of switches, each secondary switch being configured to selectively isolate a respective electrical device from the secondary distribution network, and a secondary sensor. It may be that the control system is configured to detect an electrical fault associated with the secondary distribution network based on a signal received from the secondary sensor. The control system may be configured to perform a secondary fault procedure in response to detection of an electrical fault, the secondary fault procedure comprising: (a) controlling the secondary plurality of switches such that all of the electrical devices are isolated from the secondary distribution network; and (b) subsequently controlling the switches to progressively re-couple at least some of the secondary plurality of electrical devices to the secondary distribution network in a order and monitoring for re-detection of an electrical fault based on a signal received from the secondary sensor as the electrical devices are progressively re-coupled; (c) identifying a set of one or more of the plurality of electrical devices re-coupled to the secondary distribution network to cause the re-detection of the electrical fault, the set of one or more electrical devices being a fault event set; and controlling at least one of the secondary plurality of switches to isolate the fault event set from the secondary distribution network.

According to a second aspect there is provided an aerial vehicle comprising the electrical power system of any preceding claim. The aerial vehicle may be an aircraft or a spacecraft.

According to a third aspect there is provided a method comprising determining the re-coupling order for an electrical power system in accordance with the first aspect based on statistical data relating to historical fault detection or modelled electrical failure rates. It may be that the statistical data comprises fault detection data from pre-installation testing, computer modelling of electrical device failures, and/or post-installation monitoring of the electrical power system or one or more corresponding electrical power systems.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
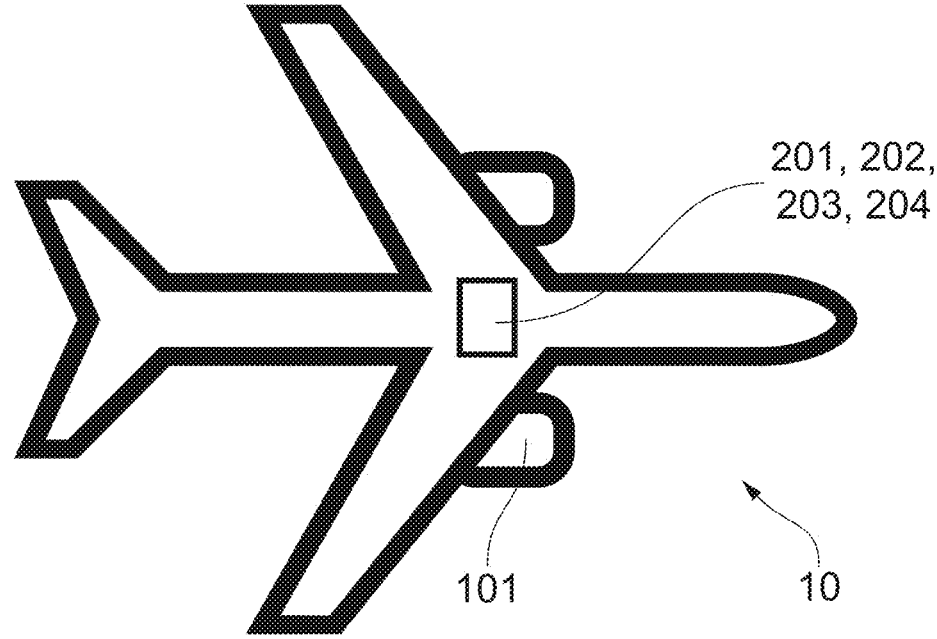
FIG. 1 is a highly schematic view of an aircraft comprising a gas turbine engine and an electrical power system.
Figure 2:
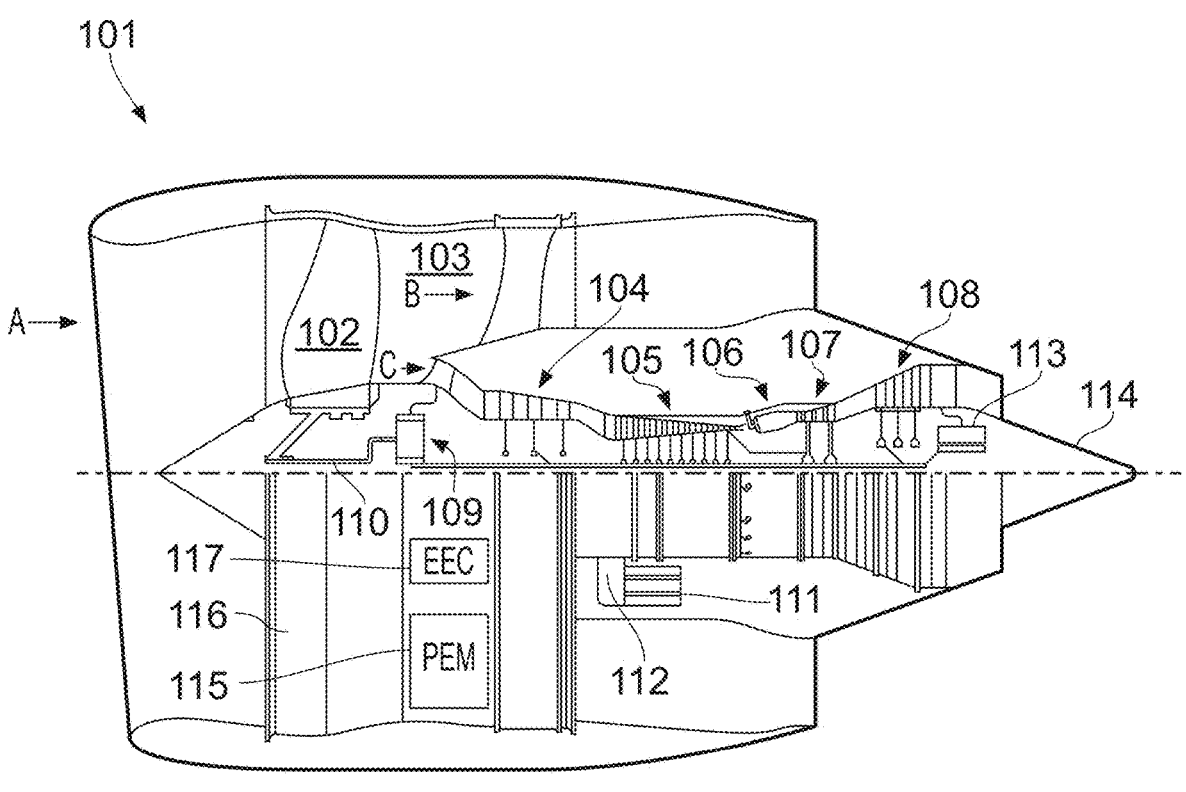
FIG. 2 shows a general arrangement of a turbofan engine suitable for use with the aircraft of FIG. 1.

FIG. 1 shows a schematic plan view of an aircraft 10 (or, more generally, an aerial vehicle 10). The aircraft 10 comprises an electrical power system. The electrical power system may be in accordance with the example electrical power systems 201, 202, 203, 204 described below with references to FIGS. 3 to 6. The aircraft 10 also comprises a propulsor 101 (e.g., a gas turbine engine 101) configured to generate thrust for propelling the aircraft 10 through the air. The propulsor 101 may generally be in accordance with the gas turbine engine 101 described below with reference to FIG. 2. Otherwise, the aircraft 10 may be provided with an alternative type of propulsor (i.e., an alternative type of propulsive device), such as a propellor or a fan configured to be driven by an electric motor. The aircraft may be used for civil and/or military purposes.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low-pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more dc busses. The dc busses allow for the distribution of electrical power to other engine electrical loads and to electrical loads on the airframe. The dc busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

Figure 3:
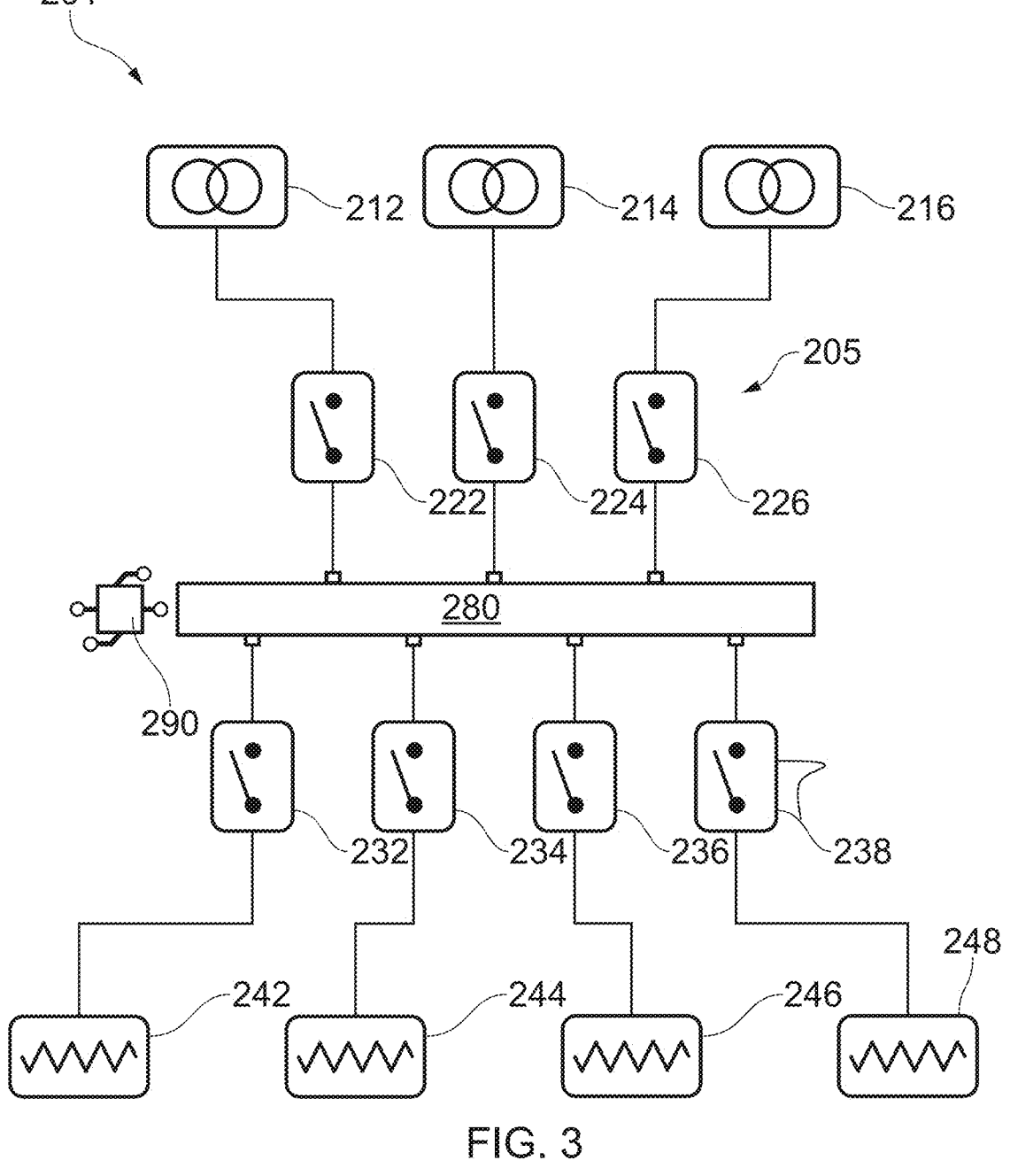
FIG. 3 is a diagram showing a first example electrical power system suitable for use with the aircraft of FIG. 1 and/or the turbofan engine of FIG. 2.

FIG. 3 is a diagram showing a first example electrical power system 201. The electrical power system 201 may be used in conjunction with the aircraft 10 and propulsor 101 of FIG. 1 and/or in conjunction with the turbofan engine 101 of FIG. 2. The electrical power system 201 comprises a plurality of electrical devices, an electrical distribution network 205 and a control system 290. The plurality of electrical devices comprises a set of electrical sources 212, 214, 216 as well as a set of electrical loads 242, 244, 246, 248. The distribution network 205 comprises a plurality of switches and at least one sensor 280.

In the example of FIG. 3, the set of electrical sources 212, 214, 216 comprises three electrical sources: a first electrical source 212, a second electrical source 214, and a third electrical source 216. However, this disclosure envisages that the plurality of electrical devices may comprise any number of electrical sources. The electrical sources may be either alternating-current electrical sources or direct-current electrical sources. Each electrical source 212, 214, 216 may be (or include), for example, a fuel-cell pack, a battery-cell pack, a photovoltaic system, an electric generator, or the like.

Also, in the example of FIG. 3, the set of electrical loads 242, 244, 246, 248 comprises four electrical loads: a first electrical load 242, a second electrical load 244, a third electrical load 246 and a fourth electrical load 248. However, this disclosure envisages that the set of electrical devices may comprise any number of electrical loads. Each electrical load 242, 244, 246, 248 may be (or include), for instance, an electric motor (e.g., the electric machines 111, 113 described above with reference to FIG. 2, an electric motor configured to drive a propellor of an aircraft in which the electrical power system 201 is incorporated, an electric motor configured to drive a pump or a compressor provided as part of a subsystem of an aircraft in which the electrical power system 201 is incorporated), an electric heater (e.g., provided to a subsystem of the aircraft 10 described above with reference to FIG. 1), an actuator (e.g., provided to a control surface of an aircraft in which the electrical power system 201 is incorporated), or the like. It will be appreciated that each load may include any of (or any suitable combination of) a resistance, a memristance, a capacitance, and/or an inductance.

The plurality of electrical loads may comprise one or more high priority loads which may also be referred to as safety critical electrical loads and/or one or more low priority loads which may also be referred to as non-safety critical electrical loads. A safety critical electrical load is an electrical load the function of which is considered to be critical to safe operation of the aircraft 10. In contrast, a non-safety critical electrical load is an electrical load the function of which is considered not to be critical to safe operation of the aircraft 10. By way of example, a safety critical electrical load may be an electrical load which is associated with continued propulsion and/or control of the aircraft 10 while a non safety critical load may be an electrical load which is not associated with continued propulsion and/or control of the aircraft 10. In the example of FIG. 3, the first electrical load 242 and the second electrical load 244 are safety critical loads whereas the third electrical load 246 and the fourth electrical load 248 are non-safety critical loads. The combination of the safety critical loads 242, 244 and the non-safety critical loads 246, 248 may be referred to as a primary set of electrical loads 242, 244, 246, 248 (to distinguish from a secondary set of electrical loads to be described later).

The distribution network 205 is configured to electrically couple each of the plurality of electrical devices to one another. In other words, the distribution network 205 is configured to electrically couple the set of electrical sources 212, 214, 216 to the set of electrical loads 242, 244, 246, 248. For this purpose, the distribution network 205 may comprise any suitable arrangement of electrical conductors (e.g., electrical busses).

The plurality of switches includes a plurality of source switches 222, 224, 226 as well as a plurality of load switches 232, 234, 236, 238. Each source switch 222, 224, 226 is configured to selectively isolate, and couple, a respective source 212, 214, 216 to the distribution network 205. Each load switch 232, 234, 236, 238 is configured to selectively isolate, and couple, a respective load 242, 244, 246, 248 to the distribution network 205. Each switch 222-226, 232-238 is preferably a contactor (e.g., a circuit breaker). If so, each contactor 222-226, 232-238 is configured to selectively physically (e.g., mechanically) isolate a respective device 212-216, 242-248 to the distribution network 205.

The sensor 280 is generally configured to monitor a parameter indicative of the presence (e.g., the development or the existence) of an electrical fault associated with each and any of the plurality of electrical devices which are coupled to the distribution network 205. To this end, the sensor 280 may be configured to monitor an electrical parameter (e.g., a voltage or a current) of a conductor (e.g., a bus) which forms a part of the distribution network 205. In the example of FIG. 3, the sensor 280 is shown as being provided to a central connecting bus of the distribution network 205 and is configured to monitor the electrical parameter of the central connecting bus. The sensor 280 is configured to output a signal corresponding to the .parameter monitored thereby.

The control system 290 is configured to carry out a method of operating the distribution network 205 as described below with reference to FIGS. 7 to 9. For this purpose, the control system 290 is configured to receive data/signals (e.g., a signal) from the sensor 280 and is configured to control a state of each of the plurality of switches (e.g., to cause each of the plurality of switches to isolate or couple the corresponding device 212, 214, 216, 232, 234, 236, 238 to the distribution network 205).

Figure 4:
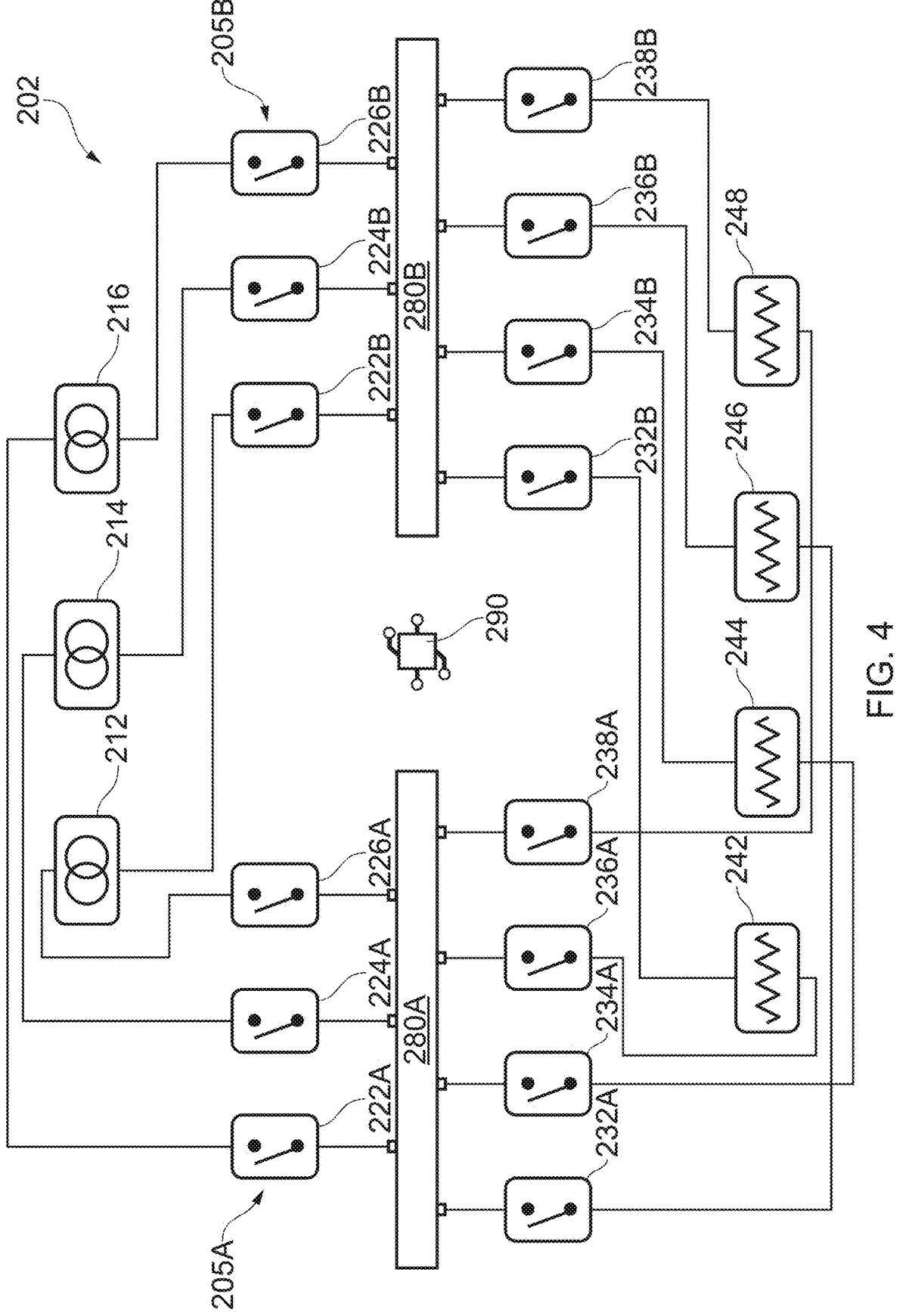
FIG. 4 is a diagram showing a second example electrical power system suitable for use with the aircraft of FIG. 1 and/or the turbofan engine of FIG. 2.

FIG. 4 is a diagram showing a second example electrical power system 202. The second example electrical power system 202 is generally similar to the first example electrical power system 201 described above with reference to FIG. 3, with like reference signs denoting common or similar features. However, the second electrical power system 202 comprises a primary electrical distribution network 205A and a secondary electrical distribution network 205B. As a result, the second example electrical power system 202 may be described as a multi-network system (or a multi-channel system). Further, each distribution network 205 comprises a plurality of switches (i.e., a primary plurality of switches and a secondary plurality of switches, respectively) and a sensor (i.e., a primary sensor 280A and a secondary sensor 280B, respectively).

Each distribution network 205A, 205B is configured to electrically couple each of the plurality of electrical devices 212-216, 242-248 to one another. In other words, each distribution network 205A, 205B is configured to electrically couple the set of electrical sources 212, 214, 216 to the set of electrical loads 242, 244, 246, 248. Compared to the single-network system 201 of FIG. 3, the multi-network system 202 of FIG. 4 provides a layer of redundancy for transferring electrical power from the set of electrical sources 212, 214, 216 to the set of electrical loads 242, 244, 246, 248. This is associated with an improved safety of the electrical power system 202.

Each plurality of switches (i.e., the primary plurality of switches and the secondary plurality of switches, respectively) includes a plurality of source switches (i.e., a primary plurality of source switches 222A, 224A, 226A and a secondary plurality of source switches 222B, 224B, 226B, respectively) as well as a plurality of load switches (i.e., a primary plurality of load switches 232A, 234A, 236A, 238A and a secondary plurality of load switches 232B, 234B, 236B, 238B, respectively).

Each source switch 222A, 224A, 226A, 222B, 224B, 226B is configured to selectively isolate, and couple, one of the plurality of sources 212, 214, 216 to the distribution network 205A, 205B such that each source 212, 214, 216 is selectively isolatable from, and couplable to, the primary distribution network 205A by means of a respective primary source switch 222A, 224A, 226A and is also selectively isolatable from, and couplable to, the secondary distribution network 205B by means of a respective secondary source switch 222B, 224B, 226B. Each load switch 232A, 234A, 236A, 238A, 232B, 234B, 236B, 238B is configured to selectively isolate, and couple, one of the respective plurality of loads to the corresponding distribution network 205A, 205B such that each load 242, 244, 246, 248 is selectively isolatable from, and couplable to, the primary distribution network 205A by means of a respective primary load switch 232A, 234A, 236A, 238A and is also selectively isolatable from, and couplable to, the secondary distribution network 205B by means of a respective secondary load switch 232B, 234B, 236B, 238B. In a similar way to that discussed above with reference to FIG. 3, each switch 222A-226A, 222B-226B, 232A-238A, 232B-238B is preferably a contactor (e.g., a circuit breaker).

Each sensor 208A, 208B is generally configured to perform a function with regards to the respective distribution network 205A, 205B which is similar to the function of the sensor 280 of the distribution network 205 described above in the context of the first example electrical power system 201. Namely, the primary sensor 280A is configured to monitor a parameter indicative of the presence of an electrical fault associated with each and any of the plurality of electrical devices which are coupled to the primary distribution network 205A while the secondary sensor 280B is generally configured to monitor a parameter which may be indicative of the presence of an electrical fault associated with each and any of the plurality of electrical devices which are coupled to the secondary distribution network 205B. Each sensor 280A, 280B is configured to output a signal corresponding to the parameter monitored thereby.

The control system 290 is configured to carry out a method of operating each respective distribution network 205A, 205B as described below with reference to FIGS. 7 to 9. To facilitate this, the control system 290 is configured to receive data/signals (e.g., a fault signal, as discussed below) from the sensors 280A, 280B and is configured to control a state of each of the respective plurality of switches (e.g., to cause each of the respective plurality of switches to isolate or couple the corresponding source 212, 214, 216 to the respective distribution network 205A, 250B).

Figure 5:
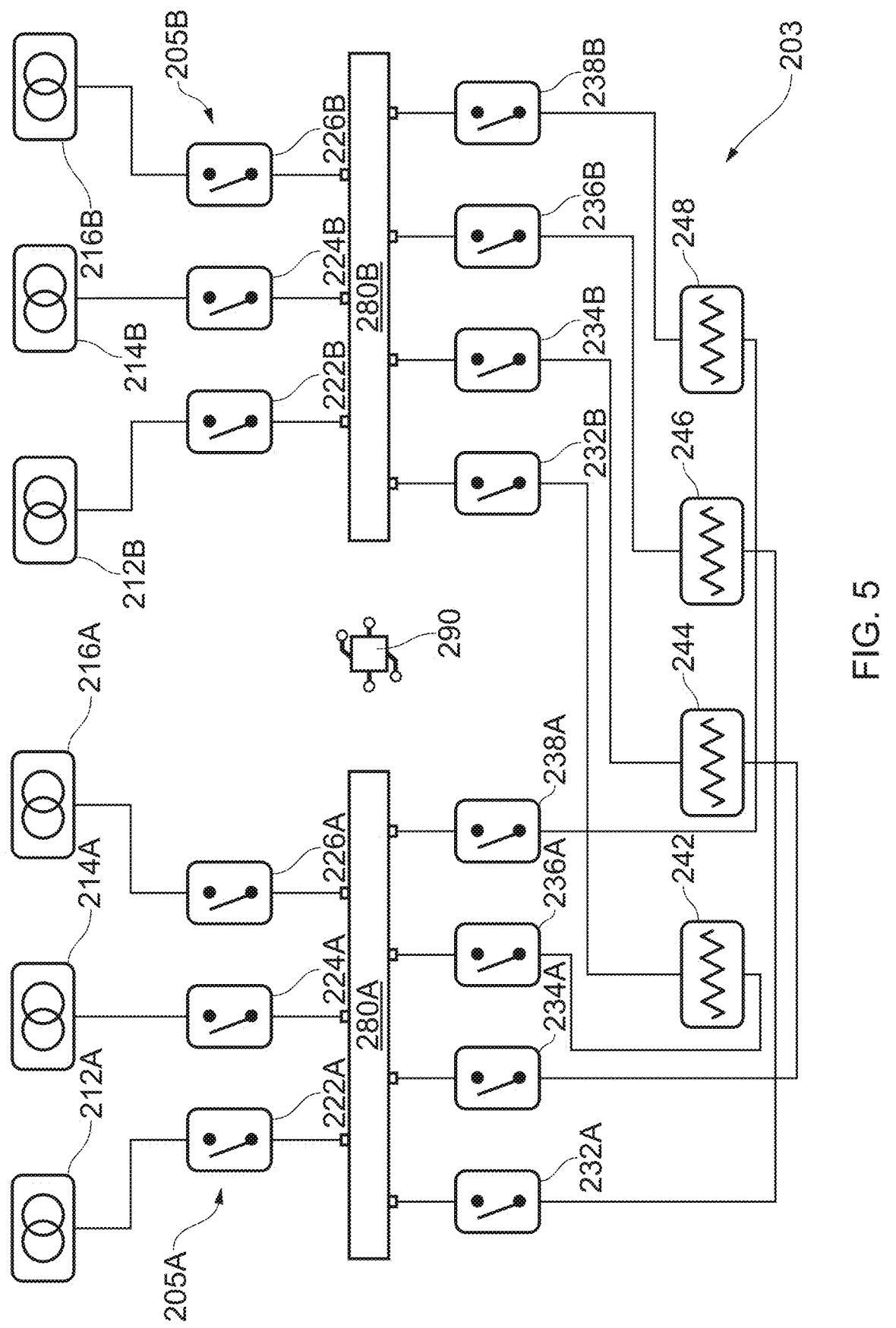
FIG. 5 is a diagram showing a third example electrical power system suitable for use with the aircraft of FIG. 1 and/or the turbofan engine of FIG. 2.

FIG. 5 is a diagram showing a third example electrical power system 203. The third example electrical power system 203 is generally similar to the second example electrical power system 202 described above with reference to FIG. 4, with like reference signs denoting common or similar features. Like the second example electrical power system 202, the third example electrical power system 203 may be described as a multi-network system (or a multi-channel system). However, unlike the second example power system 202, the third electrical power system 203 comprises a primary set of electrical sources 212A, 214A, 216A and a secondary set of electrical sources 212B, 214B, 216B.

Further, in the example of FIG. 5, each primary source switch 222A, 224A, 226A is configured to selectively isolate, and couple, one of the primary set of electrical sources 212A, 214A, 216A to the primary distribution network 205A whereas each secondary source switch 222B, 224B, 226B is configured to selectively isolate, and couple, one of the secondary set of electrical sources 212B, 214B, 216B to the secondary distribution network 205B.

Accordingly, compared to the electrical power system 202 of FIG. 4, the electrical power system 203 of FIG. 5 provides a layer of redundancy to the supply of electrical power to the plurality of electrical loads 242, 244, 246, 248 (as there are two sets of electrical sources) in addition to the layer of redundancy to the means by which electrical power can be transferred to the plurality of electrical loads 242, 244, 246, 248. This is associated with an improved safety of the electrical power system 203.

Figure 6:
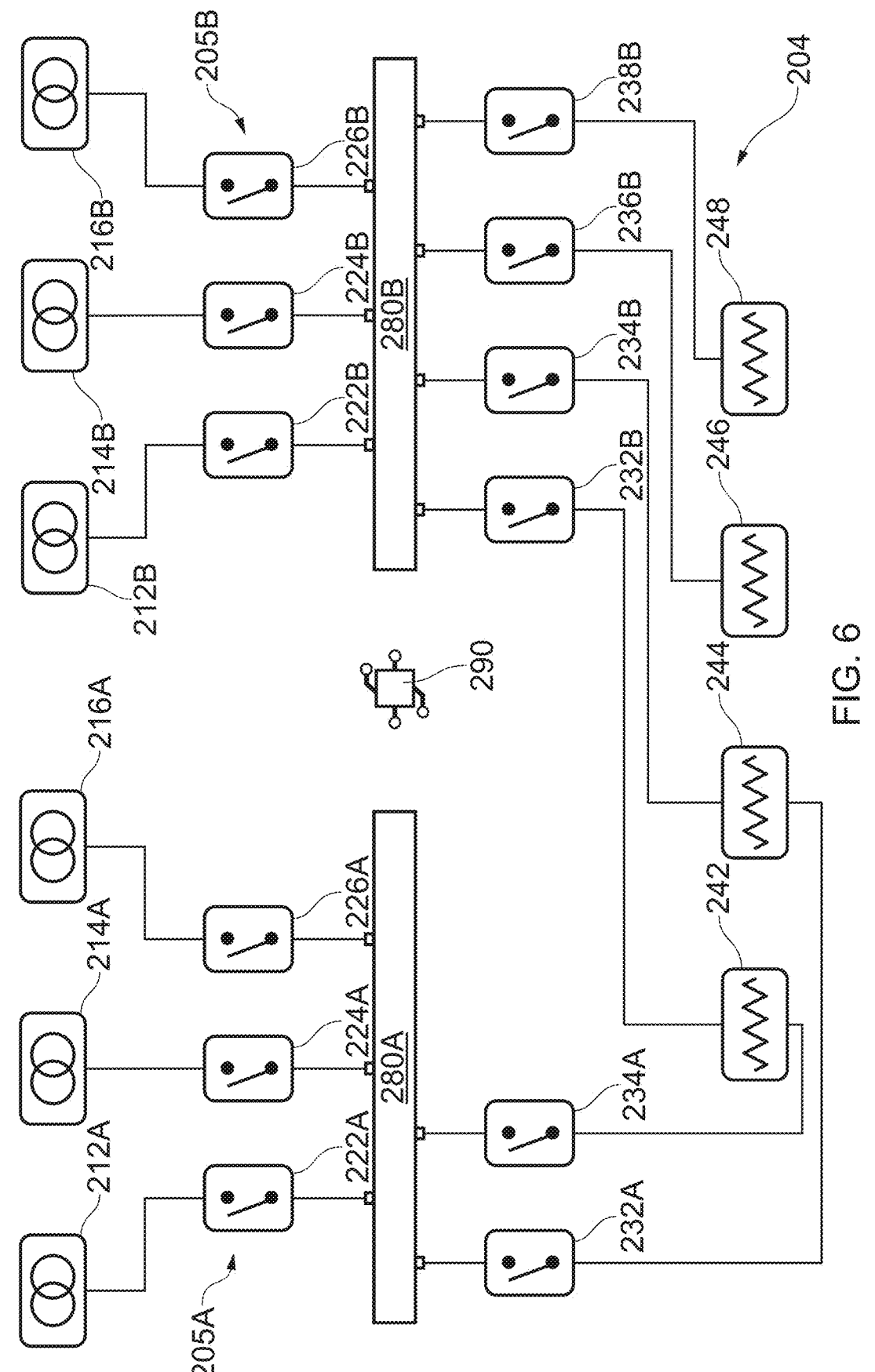
FIG. 6 is a diagram showing a fourth example electrical power system suitable for use with the aircraft of FIG. 1 and/or the turbofan engine of FIG. 2.

FIG. 6 is a diagram showing a fourth example electrical power system 204. The fourth example electrical power system 204 is generally similar to the third example electrical power system 203 described above with reference to FIG. 5, with like reference signs denoting common or similar features.

Unlike the third example electrical power system 202, the primary distribution network 205A is only configured to electrically couple the primary set of electrical sources 212A, 214A, 216A to the safety critical electrical loads 242, 244 (but not to the non-safety critical electrical loads 246, 248) in the fourth example electrical power system 204. In this context, the safety critical loads 242, 244 alone may be referred to as an overlapping secondary set of electrical loads 242, 244 (compared to the broader primary set of electrical loads 242, 244, 246, 248). However, like the third example electrical power system 203, the secondary distribution network 205B is configured to electrically couple the secondary set of electrical sources 212B, 214B, 216B to the electrical loads 242, 244, 246, 248r. In view of this, the fourth example electrical power system 204 may be described as an asymmetric multi-network system (or an asymmetric multi-channel system).

It will be appreciated that, in the example electrical power systems 202, 203, 204 described above with reference to FIGS. 4 to 6, the functionality of the control system 290 may be achieved by a plurality of individual controllers, each controller being provided to and configured to control operation of a respective distribution network 205A, 205B.

Figure 7:
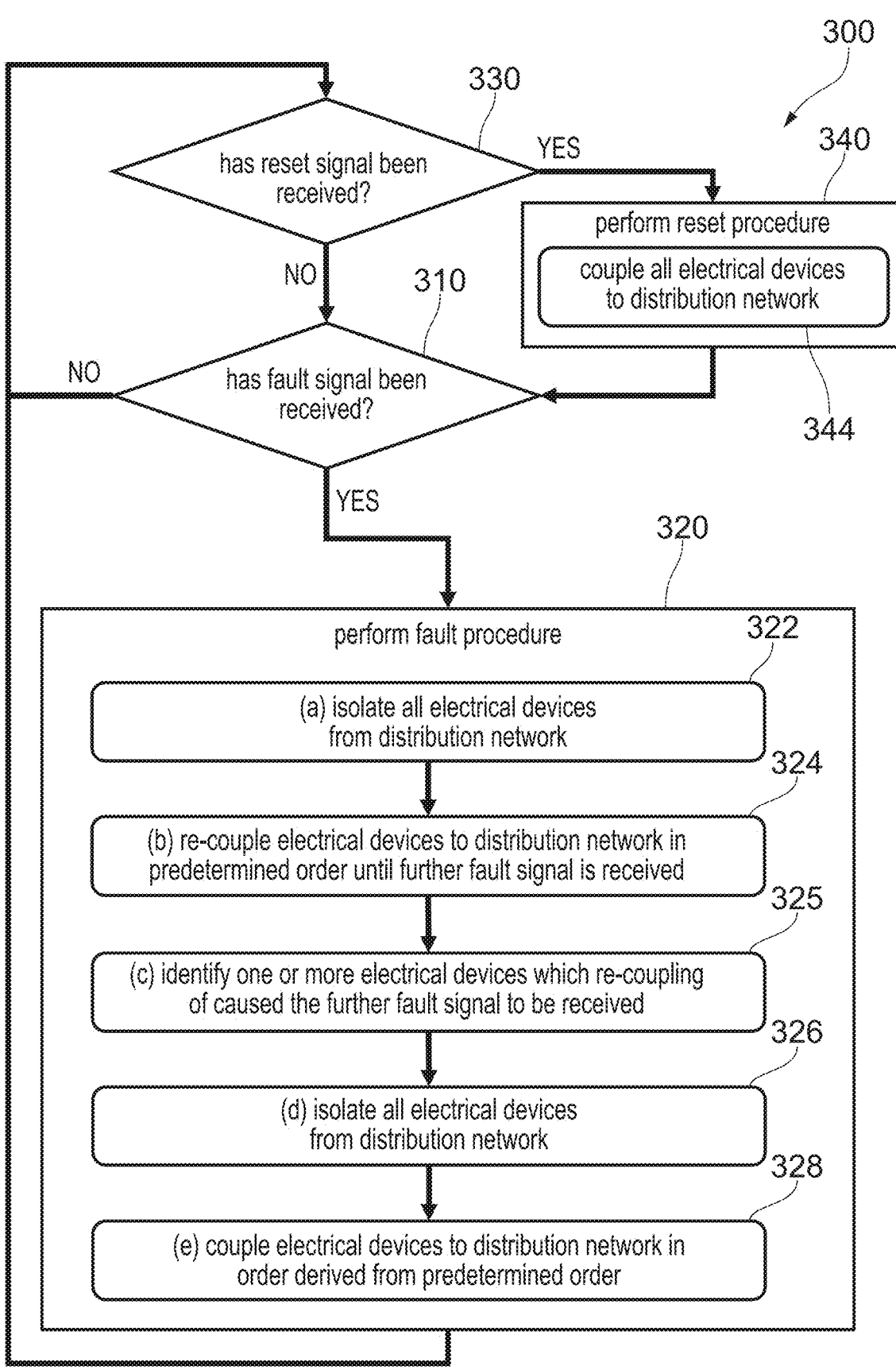
FIG. 7 is a flowchart which shows an example method of operating an electrical distribution network of an electrical power system, such as those described with reference to FIGS. 3 to 6.

FIG. 7 is a flowchart which shows an example method 300 of operating an electrical distribution network 205, 205A, 205B of an electrical power system 201, 202, 203, 204 such as those described above with reference to FIGS. 3 to 6. References herein to steps, actions, stages or processes in the context of the distribution network should be understood as referring to a single distribution network. That is, in the context of the second example electrical power system 202, the third example electrical power system 203 or the fourth example electrical power system 204, references to the distribution network 205A, 205B should be understood as referring to either the primary distribution network 205A or the secondary distribution network 205B independently, and it may be that the respective steps, actions, stages or processes are independently conducted for both the primary distribution network 205A and the secondary distribution network 205B independently.

The method 300 includes an action of determining, at block 310, whether the presence of an electrical fault is detected by determining whether the signal received from a sensor (e.g., sensor 280, 280A, 280B) is indicative of the presence of an electrical fault (which is herein after referred to as a "fault signal"). If it is determined, at block 310, that a fault signal has been received (and thus the control system 290 has detected the presence of an electrical fault based on the signal received from the sensor 280, 280A, 280B), the method 300 includes performing, at block 320, a fault procedure. On the other hand, if it is not determined that a fault signal has been so received at block 310, the method 300 includes repeating the action of determining, at block 310, whether the presence of an electrical fault is detected (e.g., after the action of determining, at block 330, whether a reset signal has been received as is described below). Accordingly, the method 300 may comprise repeatedly determining, at block 310, whether the presence of an electrical fault is detected until a positive determination that the presence of an electrical fault has been detected and the method 300 then includes performing, at block 320, the fault procedure.

The fault procedure, at block 320, includes sequentially executing the steps of:

(a) controlling, at sub-block 322, the plurality of switches such that all of the plurality of electrical devices are isolated from the distribution network 205, 205A, 205B; and (b) controlling, at sub-block 324, the switches so as to progressively (e.g., sequentially) couple at least some of (e.g., at least one of, a multiplicity of, or each/all of) the plurality of electrical devices to the distribution network 205, 205A, 205B in a first re-coupling order until a further fault signal is received from the sensor 280, 280A, 280B. Preferably, the first re-coupling order is predetermined, and may be referred to as a first predetermined order herein. However, this disclosure envisages that the first re-coupling order may not be predetermined (e.g., may be random).

The first predetermined order utilised at sub-block 324 may be such that a group (i.e., more than one but fewer than all) of the plurality of electrical devices are simultaneously coupled to the distribution network 205, 205A, 205B during execution of step (b) of the fault procedure. That is, step (b) of the fault procedure may comprise controlling the switches to progressively re-couple the electrical devices to the distribution network 205, 205A, 205B in the predetermined order in groups of electrical devices, with at least one of the groups comprising two or more of the plurality of electrical devices. It is implicit that each group comprises fewer than all of the electrical devices, as step (b) comprises progressively coupling the electrical devices. Nevertheless, the group may be defined as a sub-group of the plurality of electrical devices.

Figure 8:
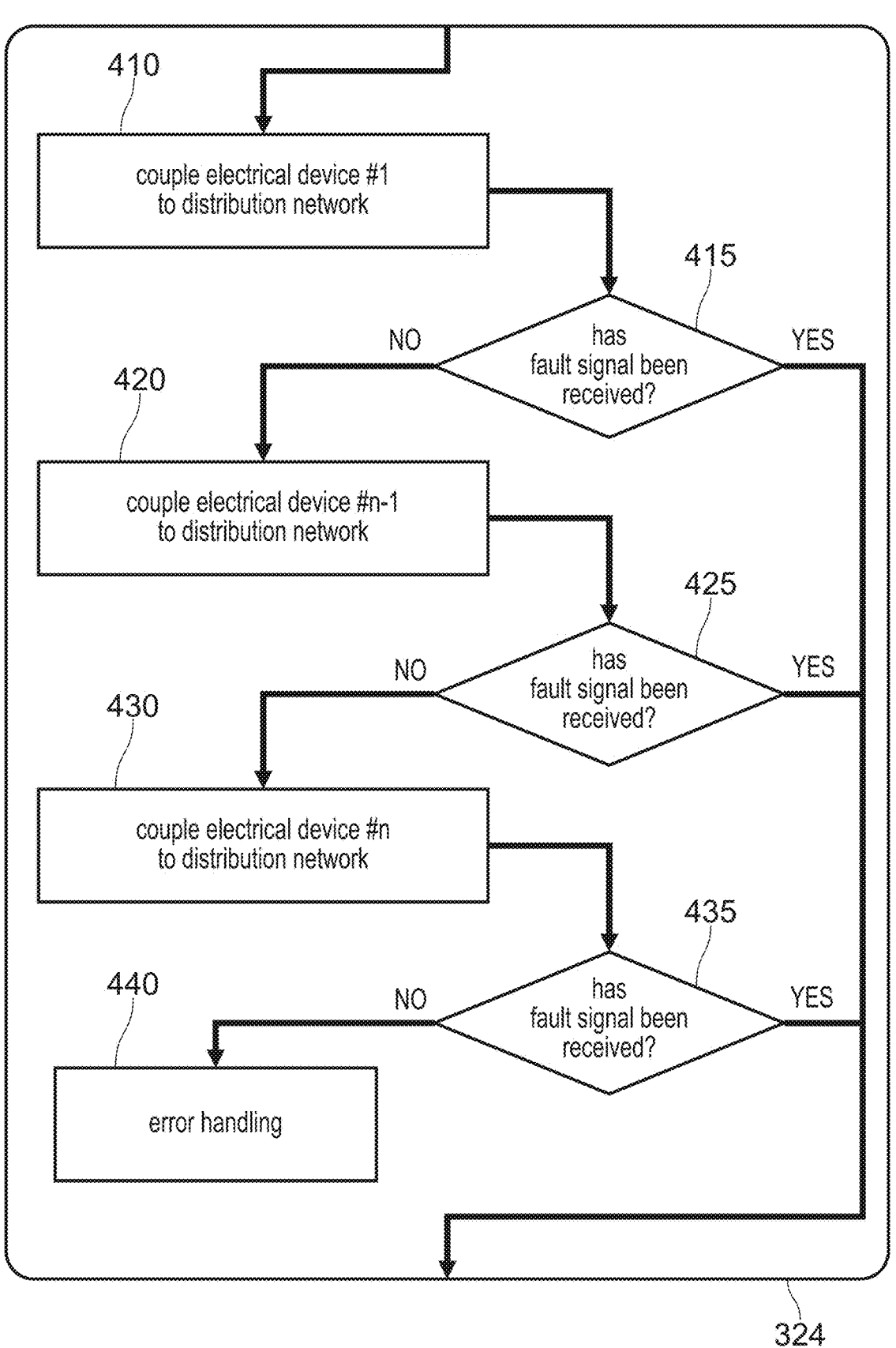
FIG. 8 is a flowchart which shows an example implementation of one of the steps of the example method shown by FIG. 7 in detail.

FIG. 8 is a flowchart which shows an example implementation of step (b), at sub-block 324, in detail. For the sake of explanation only, a total number of the electrical devices, or groups of electrical devices, to be coupled to the distribution network 205, 205A, 205C is denoted by n. In the first, second and third example electrical power systems 201, 202, 203, the total number of electrical devices to be coupled to the distribution network 205, 205A, 205B is seven (such that n=7). In the fourth example electrical power system 203, 204, the total number of electrical devices to be coupled to the primary distribution network 205A is five (such that, in respect of the primary distribution network 205A, n=5) whereas the total number of electrical devices to be coupled to the secondary distribution network 205B is seven (such that, in respect of the secondary distribution network 205B, n=7).

Step (b) commences with an action of coupling, at stage 410, the electrical device, or group of electrical devices, which is listed highest in the first predetermined order (which may be referred to as electrical device #1 or electrical device group #1 as appropriate) to the distribution network 205, 205A, 205B using the respective switch.

Step (b) then includes proceeding to an action of determining, at stage 415, whether a fault signal has been received from the sensor 280, 280A, 280B since electrical device #1, or electrical device group #1, was coupled to the distribution network 205, 205A, 205B. If it is determined, at stage 415, that a fault signal has been received since electrical device #1, or electrical device group #1, was coupled to the distribution network 205, step (b) is terminated. However, if it is not determined, at stage 415, that a fault signal has been received in this way, step (b) includes continuing to an action of coupling, at stage 420, the electrical device, or group of electrical devices, which is listed second-highest in the first predetermined order (which may be referred to as electrical device #2 or electrical device group #2 as appropriate) to the distribution network 205, 205A, 205B.

Step (b) subsequently includes proceeding to an action of determining, at stage 425, whether a fault signal has been received from the sensor 280, 280A, 280B since electrical device #2, or electrical device group #2, was coupled to the distribution network 205, 205A, 205B. If it is determined, at stage 425, that a fault signal has been received since electrical device #2, or electrical device group #2, was coupled to the distribution network 205, step (b) is terminated. But, if it is not determined, at stage 425, that a fault signal has been received in this way, step (b) includes continuing to an action of coupling, at stage 430, the electrical device, or group of electrical devices, which is listed third-highest in the first predetermined order (which may be referred to as electrical device #3 or electrical device group #3 as appropriate) to the distribution network 205, 205A, 205B.

Step (b) then includes proceeding to an action of determining, at stage 435, whether a fault signal has been received from the sensor 280, 280A, 280B since electrical device #3, or electrical device group #3, was coupled to the distribution network 205, 205A, 205B. If it is determined, at stage 435, that a fault signal has been received since electrical device #3, or electrical device group #3, was coupled to the distribution network 205, step (b) is terminated.

For the sake of brevity, in the example implementation shown by FIG. 8, the total number of electrical devices to be coupled to the distribution network 205, 205A, 205B is only three (such that n=3) and the electrical devices are individually coupled to the distribution network 205, 205A, 205B rather than being coupled in groups. Therefore, electrical device #2 may be referred to as electrical device #n−1 and electrical device #3 may be referred to as electrical device #n. In addition, the number of actions of coupling an electrical device, listed in the first predetermined order to the distribution network 205, 205A, 205B (i.e., stages in accordance with those described with respect to stages 410, 420 and 430) is equal to three and the number of actions of determining whether a fault signal has been received from the sensor 280, 280A, 280B since a relevant electrical device was coupled to the distribution network 205, 205A, 205B (i.e., stages in accordance with those described with respect to stages 415, 425 and 435) is equal to three. However, it will be appreciated that in example implementation in which the value of n is not equal to 3, the number of actions of coupling an electrical device listed in the first predetermined order to the distribution network 205, 205A, 205B (like those shown at stages 410, 420 and 430) and the number of actions of determining whether a fault signal has been received from the sensor 280, 280A, 280B since the relevant electrical device was coupled to the distribution network 205, 205A, 205B (like those shown at stages 415, 425 and 435) will vary accordingly.

Nevertheless, because the total number of electrical devices to be coupled to the distribution network 205, 205A, 205B is only three in the example of FIG. 8, electrical device #3 is the electrical device which is listed lowest in the first predetermined order. As a result, if it is not determined, at stage 435, that a fault signal has been received in this way, step (b) includes continuing to an error handling action at stage 440. The error handling action may include returning to the action of determining, at block 310, whether a fault signal has been received from the sensor and continuing thereafter as described herein.

The stages represented by blocks 415, 425 and 435 correspond to a more general action of monitoring for re-detection of an electrical fault by the sensor 280, 280A, 280B as the electrical devices are progressively re-coupled as represented by blocks 410, 420, 430 during performance of step (b) of the fault procedure.

Returning now to a description of FIG. 7, the fault procedure also comprises, following execution of steps (a) and (b) discussed above, sequentially executing the steps of:

(c) identifying, at sub-block 325, a set of one or more of the plurality of electrical devices coupled to the distribution network as the fault signal was received from the sensor 280, 280A, 280B and hence caused re-detection of the electrical fault by the sensor 280 and therefore the further fault signal to be received (i.e. the set of electrical devices coupled to the distribution network immediately before the further fault signal was received). The set identified in this step may be referred to as a fault event set of the plurality of electrical devices.

The fault procedure further comprises, following execution of steps (a), (b) and (c) discussed above, sequentially executing the steps of:

(d) controlling, at sub-block 326, the plurality of switches such that all of the plurality of electrical devices are isolated from the distribution network 205, 205A, 205B; and (e) controlling, at sub-block 328, the switches so as to re-couple at least a subset (e.g., at least one of, a multiplicity of, or each/all of) of the electrical devices (see step (b)), the subset excluding the fault event set identified at sub-block 325, to the distribution network 205, 205A, 205B in a re-coupling order which is optionally derived from the first re-coupling order (which may be referred to as a second re-coupling order). Like the first re-coupling order, the second re-coupling order is preferably predetermined, and may be referred to as a second predetermined order herein. However, this disclosure envisages that the second re-coupling order may not be predetermined (e.g., may be random). As a result, the method 300 comprises controlling at least one of the plurality of switches to isolate the fault event set from the distribution network 280, 280A, 280B.

In a similar way to the first predetermined order utilised at sub-block 324, the second predetermined order employed at sub-block 328 may be such that a group (i.e., more than one but fewer than all) of the plurality of electrical devices are simultaneously coupled to the distribution network 205, 205A, 205B during execution of step (e) of the fault procedure.

Each predetermined order determines when each electrical device will be coupled to the distribution network 205, 205A, 205B during performance of the fault procedure. Each predetermined order may be set in accordance with various technical considerations pertaining to the electrical power system. By way of example, it may be that is it is considered to be more important to couple some of the electrical devices (e.g., a "high priority" set of the electrical devices, optionally including all of the safety critical electrical devices discussed above) to the distribution network 205, 205A, 205B than others (e.g., a "low priority" set of the electrical devices, optionally including all of the non-safety critical electrical devices discussed above). Accordingly, in some examples, each predetermined order is such that the "high priority" set of electrical devices is coupled to the distribution network 205, 205A, 205B prior to the "low priority" set of electrical devices being coupled to the distribution network during execution of the fault procedure. In other words, each predetermined order may be such that re-coupling of the "high priority" set of electrical devices is prioritised over re-coupling of the "low priority" set of electrical devices during steps (b) and/or (e). FIG. 9, which is discussed in more detail below, provides an example method of setting the or each predetermined order.

In the context of the second example electrical power system 202, the third example electrical power system 203 or the fourth example electrical power system 204, a method as described herein may be simultaneously carried out by the control system 290 in respect of each of the distribution networks 205A, 205B. For example, the control system 290 may be configured to determine, as shown by block 310, whether a fault signal has been received from the primary sensor 280A and also to determine, as shown by block 310, whether a fault signal has been received from the secondary sensor 280B. If it is determined that a fault signal has been received from the primary sensor 280A, the control system 290 may then perform a primary fault procedure which generally corresponds to the fault procedure described above with respect to block 320. Otherwise, if it is determined that a fault signal has been received from the secondary sensor 280B, the control system 290 may then perform a secondary fault procedure which also generally corresponds to the fault procedure described above with respect to block 320.

However, each of the primary fault procedure and the secondary fault procedure may be adapted according to the nature of the primary distribution network 205A and the secondary distribution network 205B, respectively. Specifically, the first predetermined order and/or the second predetermined order for each of the primary fault procedure and the secondary fault procedure may differ due to, for example, any difference between the electrical devices which the distribution networks 205A, 205B are configured to electrically couple (e.g., as in the asymmetric multi-network system 204 described above with reference to FIG. 6). For this reason, the first predetermined order which is used in the primary fault procedure may be referred to as a primary first predetermined order, the second predetermined order which is used in the primary fault procedure may be referred to as a primary second predetermined order, the first predetermined order which is used in the secondary fault procedure may be referred to as a secondary first predetermined order, and the second predetermined order which is used in the primary fault procedure may be referred to as a secondary second predetermined order. In some examples, the first predetermined order and/or the second predetermined order for each of the primary fault procedure and the secondary fault procedure may be identical.

The method 300 may also comprise an action of determining, at block 330, whether a reset signal has been received. The reset signal may be received from, for example, a human-machine interface (HMI) or an application-programming interface (API) to the electrical power system 200. If it is determined, at block 330, that a reset signal has been so received, the method 300 includes performing, at block 338, a reset procedure. On the other hand, if it is not determined that a reset signal has been so received at block 330, the method 300 includes proceeding to the action of determining, at block 310, whether a fault signal has been received from the sensor 280, 280A, 280B and continuing thereafter as described herein. Receipt of the reset signal may be indicative of maintenance and/or repair (e.g., to remedy the cause of a previously-identified fault) having been carried out on the electrical power system 200.

The reset procedure, at block 340, includes executing a step of controlling, at sub-block 344, the switches so as to couple all of the electrical devices to the distribution network 205, 205A, 205B. This may include coupling the identified electrical device, or identified group of electrical devices, which were not coupled to the distribution network 280, 280A, 280B during step (e) of the fault procedure (see block 328). After the reset procedure, at block 340, has been executed, the method 300 includes proceeding to the action of determining, at block 310, whether a fault signal has been received from the sensor 280, 280A, 280B. Therefore, the method 300 includes controlling the plurality of switches such that the fault event set of the electrical devices identified at step (c) of the fault procedure (see block 325) is isolated from the distribution network 205, 205A, 205B until a reset signal is received, after which the fault event set of electrical devices identified at step (c) of the fault procedure (see block 325) are coupled to the distribution network 205, 205A, 205B.

In some examples, the at least some (and the subset thereof) of the plurality of electrical devices referred to in step (b) and/or step (e) of the fault procedure (see sub-blocks 324 and 328, respectively) may include only the "high priority" set of electrical devices (and not any of the "low priority" set of electrical devices). If so, the fault procedure, at block 320, comprises controlling the switches so as to couple only the "high priority" set of electrical devices to the distribution network 205, 205A, 205B and the reset procedure, at block 340, includes coupling the "low priority" set of electrical devices to the distribution network 280, 280A, 280B. Further, if so, it may be that all of the "high priority" set of electrical devices are simultaneously coupled to the distribution network 205, 205A, 205B during execution of step (b) of the fault procedure and the fault procedure, at block 320, does not comprise any of steps (c) to (e). In this way, if the "high priority" set of electrical devices includes all of the safety critical electrical devices discussed above, all safety critical functionalities of the electrical power system may be restarted in just one isolation-coupling cycle (e.g., steps (a) and (b) of the fault procedure).

After step (e) of the fault procedure has been executed, the fault procedure is ended and the method 300 includes returning to the action of determining, at block 310, whether a fault signal has been received from the sensor 280, 280A, 280B (e.g., after the action of determining, at block 330, whether a reset signal has been received).

If it is subsequently determined that that a fault signal has been so received, the method 300 includes once again performing, at block 320, the fault procedure (which may referred to as a second performance of the fault procedure). However, in such a scenario and if a reset signal has not been received as determined at block 330, step (b) of the fault procedure includes controlling, at sub-block 324, the switches so as to couple at least some (e.g., at least one of, a multiplicity of, or each/all of) of the electrical devices, except the electrical device or the group of electrical devices previously-identified at sub-block 325, to the distribution network 205, 205A, 205B in the first predetermined order. Step (c) then includes identifying, at sub-block 325, a set of one or more of the plurality of electrical devices coupled to the distribution network as the further fault signal was received from the sensor 280, 280A, 280B and hence caused re-detection of the electrical fault by the sensor 280 and therefore the further fault signal to be received (i.e. the set of electrical devices coupled to the distribution network immediately before the further fault signal was received). The set identified at sub-block 325 during the second performance of the fault procedure may be referred to as a newly-identified fault event set of the plurality of electrical devices. In a similar way, step (e) of the fault procedure includes controlling, at sub-block 328, the switches so as to re-couple at least a subset of the electrical devices (see step (b)), the subset excluding the fault event set of electrical devices previously-identified at sub-block 325 and the newly-identified fault event set of electrical devices, to the distribution network 205, 205A, 205B in an order which may be derived from (and therefore similar to) the predetermined order or not derived from (and therefore possibly dissimilar to) the predetermined order. This ensures that the second performance of the fault procedure does not include attempting to re-couple the electrical device(s) which was (were) previously isolated from the distribution network 205, 205A, 205B.

The electrical power systems and methodologies described herein facilitate the identification and isolation of one or more faulty parts of an electrical distribution network while keeping the other part(s) of the electrical distribution network operational.

In turn, the methodologies described herein may reduce a need for electrical power system to include a large number of independent electrical distribution networks in order to provide a desired level of safety (e.g., to the aerial vehicle in which it is incorporated). In addition or instead, the methodologies described herein may dispense with a need to use a relatively complex fault detection devices. This is associated with more reliable fault accommodation (i.e., identification and isolation) and/or keeping the electrical power system operational for a longer period of time.

The methodologies described herein can be used in multi-network electrical power systems (i.e., a multi-channel system) having at least a primary distribution network and a secondary distribution network. In such cases, the secondary distribution network can continue to be used while the fault procedure is performed by the control system in respect of the primary distribution network. FIGS. 4 and 5 show multi-network electrical power systems 202, 203 in which each distribution network 205A, 205B is rated to support full operation of each of the electrical loads 242-248.

If such a multi-network electrical power system is used to provide critical system/component redundancy (i.e., a multi-network architecture is safety critical), identification and isolation of a fault-affected electrical device followed by recoupling of the non-affected electrical devices restores redundancy. In particular, every safety critical electrical load may still be powered by two independent distribution networks 205A, 205B despite one of the non-safety electrical loads having been isolated from at least one of the distribution networks 205A, 205B. This is in contrast to previously-considered electrical power systems in which an entire distribution network may be disabled following the detection of a fault. In such systems, the fault must be (manually) fixed and redundancy must be restored before the electrical power system may be safely used again.

If a multi-network architecture is not safety critical and is instead used to extend a maintenance-free period of the electrical power system, the methodologies described herein may further extend the maintenance-free period by allowing the electrical power system to continue operating despite the existence of multiple identified faults. The methodologies described herein can also be used to support post-flight or inter-flight maintenance activities for the purpose of identifying fault-affected electrical devices.

During performance of the fault procedure, the control system 290 may request that, or cause, a reduction in a power output of one of more of the electrical sources so as to reduce a switch-on current when the electrical devices are coupled to the distribution network 205, 205A, 205B during step (b). This may enable better management of the coupling of the electrical devices to the distribution network 205, 205A, 205B during step (b).

In addition or instead, the electrical power system 201, 202, 203, 204 may comprise one or more soft-start circuits to better manage coupling of the electrical devices to the distribution network 205, 205A, 205B during step (b). For example, one or more (e.g., each) of the plurality of switches may form part of a soft-start circuit. The or each soft-start circuit may be generally configured to temporarily introduce a high impedance (e.g., resistance) at their input for a desired soft-start period. Once the soft-start period is over, the high impedance is removed either by internally bypassing the device used to provide the high impedance (e.g., a resistive device) using a relay, a transistor or a thyristor.

If an electrical power system in accordance with the present disclosure is also provided with auto-reclose devices and/or insulation monitoring devices positioned at various points within the electrical power system for any purpose (e.g., for a purpose of further fault identification and isolation strategies), the control system 290 may be configured to control the auto-reclose devices and/or the insulation monitoring devices so as to be closed (i.e., in a conducting state) during performance of the fault procedure described herein with reference to block 320 to enable the identification of a relevant electrical device or group of electrical devices at step (c) thereof (see block 325).

Figure 9:
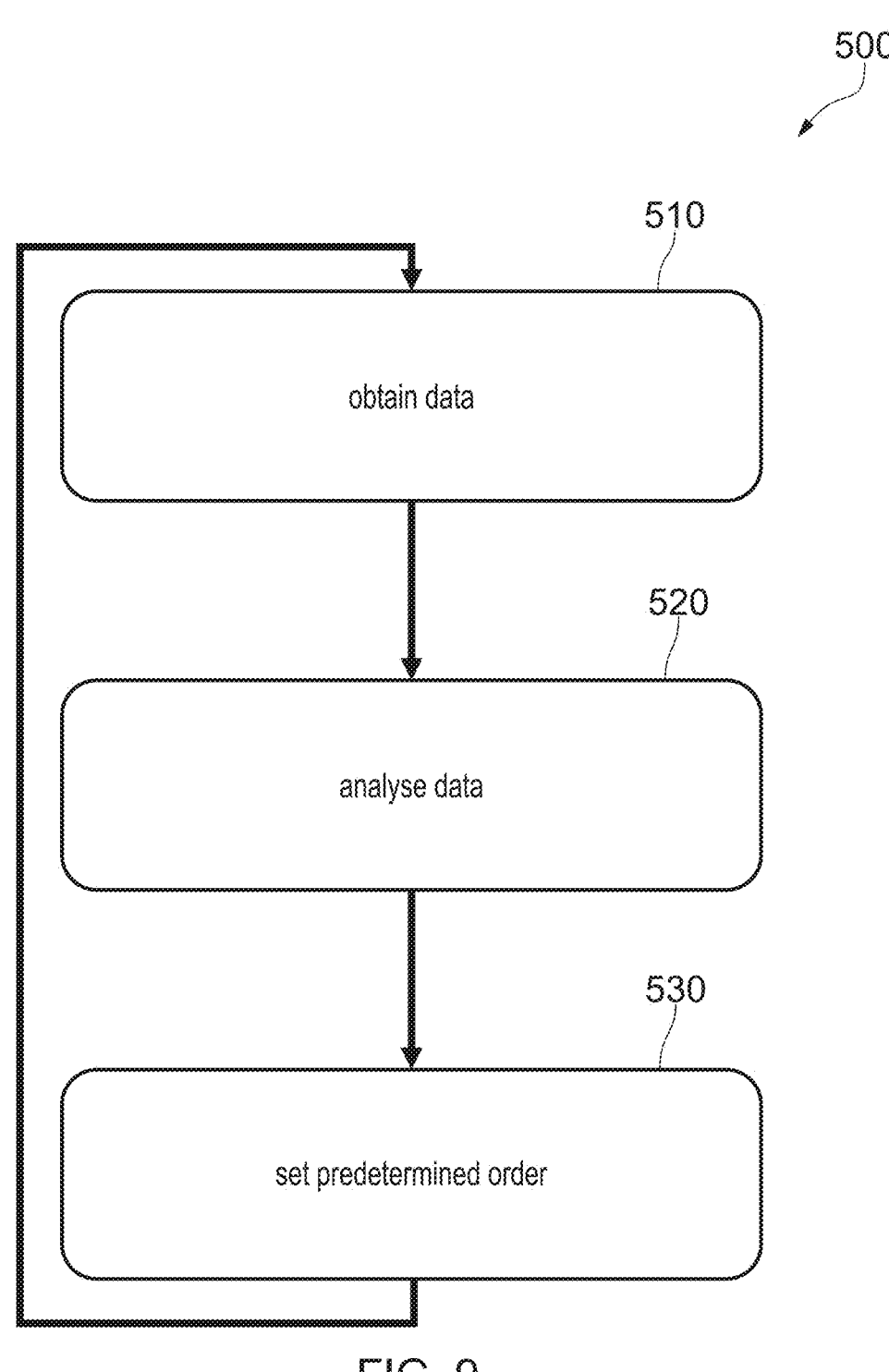
FIG. 9 flowchart which shows an example method of setting a re-coupling order for use in the example method of operating an electrical distribution network shown by FIG. 7.

FIG. 9 is a flowchart which shows an example method 500 of setting (e.g., determining) the first predetermined order for utilisation at sub-block 324 of the method 300 described above with reference to FIG. 7 and/or the second predetermined order for employment at sub-block 328 of the method 300 described above with reference to FIG. 7.

The method 500 comprises, at block 510, obtaining statistical data relating to the electrical power system which is the subject of the method 300 described above with reference to FIGS. 7 and 8. More specifically, the statistical data relates to historical fault detection or modelled electrical failure rates of the electrical power system. The statistical data may comprise fault detection data derived from a design process of the electrical power system, a manufacturing/installation process of the electrical power system or a an-service monitoring system of the electrical power system. For example, the fault detection data may be obtained by pre-installation testing of the electrical power system 201, 202, 203, 204 or one or more corresponding electrical power systems (e.g., one or more electrical power systems belonging to the same production batch as the electrical power system 201, 202, 203, 204), computer modelling of the electrical power system 201, 202, 203, 204, and/or post-installation monitoring of the electrical power system 201, 202, 203, 204.

The method 500 also comprises, at block 520, statistically analysing the data received at block 510. The analysis may be conducted in order to identify which parts of the distribution system 205, 205A, 205B are most likely to be affected by or the cause of a fault detected by the control system 290.

The method 500 further comprises, at block 530, setting the predetermined order based on the statistical analysis conducted at block 520. Namely, if the data obtained at block 510 indicates that an individual part of the distribution system 205, 205A, 205B is especially likely (e.g., most likely) to be the cause of a fault detected by the control system 290, the predetermined order may be set such that the electrical devices associated with the individual part of the distribution system are listed relatively high (e.g., highest) in the predetermined order. For example, in the context of the first example electrical power system 201, if the data obtained at block 510 indicates that a short-circuit between the third electrical source 246 and the fourth electrical source 248 is most likely to be the cause of a fault detected by the control system 290 in use, then the or each predetermined order may be set such that the third electrical source 246 and/or the fourth electrical source 248 form at least part of a "prioritised" group of electrical devices which are simultaneously coupled to the distribution network 205 during execution of step (b), and optionally step (e), of the fault procedure. More specifically, the or each predetermined order may be set such that the "prioritised" group of electrical devices are simultaneously coupled to the distribution network 205 relatively early during execution of step (b), and optionally step (e), of the fault procedure. That is, with reference to the description provided above with reference to FIG. 8, the "prioritised" group of electrical devices may be included (i.e., listed) within the or each predetermined order as electrical device group #1 or electrical device group #2 rather than electrical device group #3.

Figure 10:
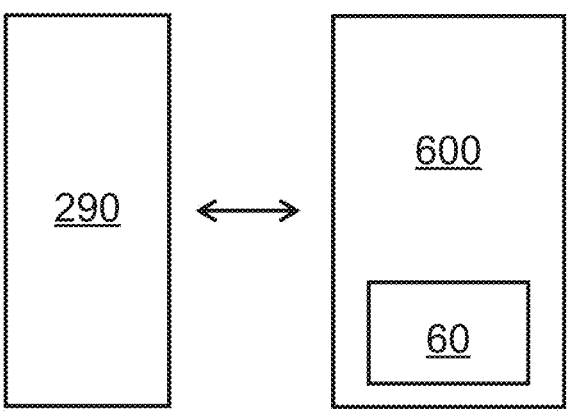
FIG. 10 shows an example machine-readable medium/data carrier.

FIG. 10 shows, highly schematically, a machine-readable medium/data carrier 600 having stored thereon a computer program 60 comprising instructions which, when executed by a data processing apparatus 660, cause the data processing apparatus 660 to execute a method 300 as described herein with reference to FIGS. 7 and 8 or to execute a method 500 as described herein with reference to FIG. 9.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the methodologies described herein could be used for many other applications. These include, but are not limited to, space-based applications. If so, the systems and methods described herein may be used in conjunction with, or as part of, a spacecraft.

Although only one sensor 280, 280A, 280B has been shown and described in respect of each distribution network 205, 205A, 205B, it may be that multiple such sensors are provided to each distribution network 205, 205A, 205B for similar purposes, and the methodologies described herein may utilise signals from each sensor in the same way as described in respect of the single sensor 280, 280A, 280B herein.

The invention claimed is:

1. An electrical power system for an aerial vehicle, the electrical power system comprising a plurality of electrical devices, a distribution network and a control system, wherein the plurality of electrical devices includes a primary set of electrical sources and a primary set of electrical loads;

wherein the distribution network is configured to electrically couple the primary set of electrical loads to the primary set of electrical sources;

wherein the distribution network comprises:

a plurality of switches, each switch being configured to selectively isolate a respective electrical device from the distribution network, and a sensor; and wherein the control system is configured to detect an electrical fault associated with the distribution network based on a signal received from the sensor, and is further configured to perform a fault procedure in response to detection of an electrical fault, the fault procedure comprising:

(a) controlling the plurality of switches such that all of the electrical devices are isolated from the distribution network;

(b) subsequently controlling the switches to progressively re-couple at least some of the plurality of electrical devices to the distribution network in a re-coupling order and monitoring for re-detection of an electrical fault based on a signal received from the sensor as the electrical devices are progressively re-coupled;

(c) identifying a set of one or more of the plurality of electrical devices re-coupled to the distribution network to cause the re-detection of the electrical fault, the set of one or more electrical devices being a fault event set; and controlling at least one of the plurality of switches to isolate the fault event set from the distribution network.

2. The electrical power system of claim 1, wherein the fault procedure comprises:

(b) controlling the switches to progressively re-couple the electrical devices to the distribution network in the re-coupling order in groups of electrical devices, at least one of the groups comprising two or more electrical devices.

3. The electrical power system of claim 1, wherein the fault procedure comprises:

(a) controlling the switches such that all of the electrical devices are isolated from the distribution network; and (b) subsequently controlling the switches to progressively re-couple each of the electrical devices to the distribution network in the re-coupling order until re-detection of the electrical fault.

4. The electrical power system of claim 3, wherein the fault procedure further comprises:

(d) subsequently controlling the switches such that all of the electrical devices are isolated from the distribution network; and (e) controlling the switches to re-couple a subset of the at least some of the plurality of electrical devices which excludes the fault event set.

5. The electrical power system of claim 4, wherein the control system is further configured to control the switches such that the fault event set of one or more electrical devices is isolated from the distribution network until a reset signal is received.

6. The electrical power system of claim 1, wherein the primary set of electrical loads includes a high priority set of one or more electrical loads, and wherein the re-coupling order is such that re-coupling of the high priority set to the distribution network is prioritised during execution of the fault procedure.

7. The electrical power system of claim 6, wherein the re-coupling order is such that all electrical loads of the high priority set are simultaneously re-coupled to the distribution network during execution of the fault procedure.

8. The electrical power system of claim 6, wherein the primary set of electrical loads includes a low priority set of one or more electrical loads, and wherein the re-coupling order is such that all of the high priority set are re-coupled to the distribution network before any of the low priority set are re-coupled to the distribution network during execution of the fault procedure.

9. The electrical power system of claim 8, wherein the fault procedure comprises controlling the switches to re-couple only the high priority set of electrical devices to the distribution network; and the control system is configured to control the switches such that the low priority set of electrical devices are isolated from the distribution network until a reset signal is received.

10. The electrical power system of claim 1, wherein:

the distribution network is a primary distribution network, the plurality of switches is a primary plurality of switches, the sensor is a primary sensor, and the fault sequence is a primary fault sequence;

the electrical power system comprises a secondary distribution network distinct from the primary distribution network; and the secondary distribution network is configured to electrically couple the primary set of electrical loads or an overlapping secondary set of electrical loads to:

the primary set of electrical sources, or a secondary set of electrical sources.

11. The electrical power system of claim 10, wherein the secondary distribution network is configured to electrically couple the primary set of electrical loads to:

the primary set of electrical sources, or a secondary set of electrical sources.

12. The electrical power system of claim 10, wherein the secondary distribution network comprises a secondary plurality of switches, each secondary switch being configured to selectively isolate a respective electrical device from the secondary distribution network, and a secondary sensor; and wherein the control system is configured to detect an electrical fault associated with the secondary distribution network based on a signal received from the secondary sensor, and is further configured to perform a secondary fault procedure in response to detection of an electrical fault, the secondary fault procedure comprising:

US 12,612,173 B2

21

(a) controlling the secondary plurality of switches such that all of the electrical devices are isolated from the secondary distribution network; and (b) subsequently controlling the switches to progressively re-couple at least some of the secondary plurality of electrical devices to the secondary distribution network in a re-coupling order and monitoring for re-detection of an electrical fault based on a signal received from the secondary sensor as the electrical devices are progressively re-coupled;

(c) identifying a set of one or more of the plurality of electrical devices re-coupled to the secondary distribution network to cause the re-detection of the electrical fault, the set of one or more electrical devices being a fault event set; and controlling at least one of the secondary plurality of switches to isolate the fault event set from the secondary distribution network.

13. An aerial vehicle comprising the electrical power system of claim 1.

14. A method comprising determining the re-coupling order for the electrical power system of claim 1 based on statistical data relating to historical fault detection or modelled electrical failure rates.

15. The method of claim 14, wherein the statistical data comprises fault detection data from pre-installation testing, computer modelling of electrical device failures, and/or post-installation monitoring of the electrical power system or one or more corresponding electrical power systems.

* * * * *